(12) United States Patent
Grosser

(10) Patent No.: US 6,263,924 B1
(45) Date of Patent: Jul. 24, 2001

(54) VEHICLE ENGINE SYSTEM ADDITIVE DISPENSER

(75) Inventor: Richard W. Grosser, Medford, NJ (US)

(73) Assignee: Mobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/444,102

(22) Filed: Nov. 22, 1999

Related U.S. Application Data

(60) Provisional application No. 60/109,430, filed on Nov. 23, 1998.

(51) Int. Cl.[7] .................................................. B65B 1/04

(52) U.S. Cl. ......................... 141/102; 141/98; 141/392; 220/86.2

(58) Field of Search .................. 141/4, 5, 9, 11, 141/83, 94, 98, 100, 102–105, 231, 392; 220/86.2

(56) References Cited

U.S. PATENT DOCUMENTS

| | | | |
|---|---|---|---|
| 3,603,359 | 9/1971 | Belue | 141/208 |
| 3,884,255 | 5/1975 | Merkle | 137/265 |
| 3,938,565 | 2/1976 | Robinson, Jr. et al. | 141/392 |
| 4,161,160 | 7/1979 | Hicks et al. | 123/1 A |
| 4,596,277 | 6/1986 | Djordjevic | 141/98 |
| 4,852,892 | 8/1989 | Reid | 280/834 |
| 5,331,994 | 7/1994 | Bryan, III et al. | 137/1 |
| 5,345,979 | 9/1994 | Tucker et al. | 141/1 |
| 6,032,703 | 3/2000 | Baker et al. | 141/94 |

*Primary Examiner*—Steven O. Douglas
(74) *Attorney, Agent, or Firm*—Paul E. Purwin

(57) ABSTRACT

The present disclosure provides a dispensing system for a fuel additive. This dispensing system comprises two subsystems, one being located in a vehicle and the other located in a fuel pump. The dispensing system of the present disclosure dispenses a liquid fuel additive into a fuel additive storage container of a vehicle at the time the vehicle is fueled at a fuel pump. According to the present disclosure, the fuel additive is a solution of urea, water and a monohydric or polyhydric alcohol. A gasoline performance enhancer may also be used as a fuel additive in the dispensing systems of the present disclosure.

25 Claims, 2 Drawing Sheets

VEHICLE ENGINE SYSTEM ADDITIVE DISPENSER

CROSS-REFERENCE TO RELATED APPLICATION

This application relates to, and claims priority from, U.S. provisional patent application Ser. No. 60/109,430, filed on Nov. 23, 1998.

U.S. patent application Ser. No. 09/444,103, filed concurrently relates to liquid, urea-containing treatment solutions for use in treating diesel engine exhaust gases.

FIELD OF THE INVENTION

The present invention relates to a dispensing system for a fuel additive (or treatment agent) which may be used in the operation of a vehicle. It relates more particularly to a dispensing system for dispensing a liquid fuel additive into the fuel additive storage container in a vehicle at the same time that the vehicle is fueled from a fuel pump.

BACKGROUND OF THE INVENTION

Conventionally, road vehicles have operated with fuel, usually a hydrocarbon fuel such as gasoline, road diesel fuel, or even compressed natural gas, stored onboard the vehicle with the supply replenished at intervals as the fuel is consumed. Typically, liquid fuel such as gasoline and diesel fuel are replenished from dispensing units commonly referred to as fuel pumps at roadside service stations. Other consumables used in the vehicle, such as engine oil, transmission fluid and other fluids, are generally replaced only when the vehicle is serviced at extended intervals, generally at intervals of a few thousand miles. Thus, the only consumable material requiring frequent replenishment has been the fuel.

Current concerns about the environmental effects of the internal combustion engine have led to regulations on vehicle emissions, both evaporative and combustive, and significant efforts have been made in the vehicle industry as well as the fuel industry to reduce levels of emission, especially of pollutants such as sulfur oxides ($SO_x$), nitrogen oxides ($NO_x$) and carbon monoxide (CO). Significant improvements have been achieved by the use of catalytic converters onboard vehicles but further improvements are desired, particularly with respect to nitrogen oxide emissions. Unlike emissions of sulfur oxides which are dependent upon the amount of sulfur in the fuel, a factor which is capable of control by suitable refining technology, nitrogen oxides tend to be produced primarily by a combination of atmospheric nitrogen and oxygen under the conditions encountered in the combustion chamber of an internal combustion engine.

Nitrogen oxides may be reduced to nitrogen by reaction with ammonia under selective catalytic reduction (SCR) conditions, but as ammonia would present hazards in the event of an accident to a vehicle containing it, it is unattractive for use in conventional road vehicles. One alternative, however, is the use of urea as a source of ammonia because urea can undergo thermal decomposition and hydrolysis to form ammonia, which then reacts with nitrogen oxides under SCR conditions in a suitable catalytic converter. Although urea is a solid, it can be used in the form of an aqueous solution, which is convenient for storage on the vehicle during use and for dispensing into the vehicle. An aqueous urea solution can also be injected into the engine/exhaust system to undergo thermal decomposition and hydrolysis to form ammonia, which can then react with nitrogen oxides as desired. Provided that the aqueous system can be prevented from solidifying by addition of suitable additives, aqueous urea solutions represent a desirable solution to the problem of controlling emissions of nitrogen oxides.

Of particular importance for aqueous urea solutions is the prevention of solidification at the low temperatures usually encountered by vehicle users in the colder climatic regions. Freezing is a particular problem of aqueous-based solutions thus creating a need for liquid exhaust treatments that will maintain the liquid state down to storage temperatures of at least about −20° F. (about −30° C.). In consideration of the potential application of SCR methods for the lowering of nitrogen oxide emissions in motor vehicle exhaust, specific urea formulations that will resist freezing at low temperatures are especially desirable.

Constraining design factors pertaining to fuel additive dispensing systems include that the additive dispensing and emission control systems be robust, easy to use and maintain by skilled and unskilled persons, and be inexpensive in view of the large number of road vehicles currently in use and the social need for improved vehicle technology to be readily accessible to all members of the community. Therefore, the vehicle may be equipped with a self-contained system that provides the vehicle with sufficient fuel additive (treatment agent) such that replenishment is necessary only at extended intervals coinciding with the regular service intervals of the vehicle. However, with service intervals, whether for oil changes or mechanical attention, becoming necessary only at increasingly extended intervals, it is possible that the supply of fuel additive could become depleted between regular servicing intervals, particularly if the need for regular servicing is neglected, as it often is. Alternatively, the vehicle may be equipped with a system that replenishes the supply of fuel additive or treatment agent whenever the fuel is replenished, thereby ensuring that the supply of treatment agent or fuel additive is available as long as fuel is available. From the point of view of ensuring constant supply of the fuel additive or treatment agent, this approach is preferred.

Dual tank systems generally have been described in U.S. Pat. Nos. 3,884,255 and 4,852,892. These systems, however, possess dual tanks that are designed to hold identical liquids and are either filled separately or simultaneously by means of a cross-over connection between tanks. Similarly, the systems described in U.S. Pat. Nos. 4,161,160 ('160 patent), 4,596,277 ('277 patent), and 5,331,994 ('994 patent) contain a fuel additive tank and at least one fuel tank. The systems disclosed in the '160, '277 and '994 patents, however, are not designed to feed fuel additive and fuel individually, but simultaneously, during replenishment. For example, the '160 patent discloses a diesel fuel supply system in which the fuel additive is added to the fuel tank. Similarly, the '994 patent is directed to an additive dispensing system in which metered quantities of fuel additive are added to fuel in a fuel tank. Furthermore, the '277 patent discloses a metering system for adding a fuel additive to fuel in the fuel tank of an internal combustion engine.

From the point of view of convenience to the vehicle operator, it is desirable that the treatment agent or fuel additive be added at the same time as the fuel, without any additional effort or manipulation on the part of the operator, and further to ensure that replenishment of the treatment agent takes place substantially concurrently with the fueling process. The present invention is directed to an integrated dispensing system which meets these requirements.

SUMMARY OF THE INVENTION

The present invention provides a dispensing system for co-delivery of fuel and a fuel additive (or treatment agent)

which is used in the operation of a vehicle, for example, an exhaust after-treatment agent which is used in the form of a liquid that is consumed during vehicle operation. Agents of this kind include aqueous solutions of urea, either as such or with other additives as described in copending U.S. patent application Ser. No. 09/444,103 entitled "Liquid Urea Exhaust Gas Treatment Additive", R. W. Grosser (inventor), Mobil Case No. 10089-1, PL 98- 64, filed Nov. 22, 1999. Other fuel additives include gasoline performance enhancers as known in the art including, but not limited to, octane enhancers, detergents, and lubricity additives.

The dispensing system of the present invention has two subsystems: a mobile subsystem incorporated into a vehicle, and a stationary subsystem incorporated into a vehicle fuel dispenser, commonly known as a fuel pump. The mobile subsystem comprises a storage container for the fuel additive or treatment agent within the vehicle with a level sensor to determine the amount of fuel additive in the storage container. Instead of a level sensor, the mobile subsystem may comprise a mechanical level indicator. The storage container may conventionally be a tank with a suitable vent tube mounted within the vehicle, and because relatively small amounts of the fuel additive will normally be required, it need not contain more than about 4 liters of the fuel additive. In fact, smaller storage containers may be used if desired in smaller vehicles, for example, about 2 liters which may supply enough fuel additive for almost 1,500 km. By using an aqueous urea solution as the fuel additive or treatment agent, it is projected that with a 30% urea solution, approximately 12 liters would suffice for approximately 15,000 km of vehicle operation, although this will depend upon the size of the engine in the vehicle.

The level sensor in the fuel additive storage container or treatment agent storage container of the mobile subsystem is connected to a signal transmitter which indicates to the stationary dispensing system whether the vehicle requires additional fuel additive to be added when the vehicle is being fueled.

The stationary subsystem comprises a storage container for the fuel additive which is maintained in the vicinity of the fuel dispenser or fuel pump and a dispensing conduit which extends from the storage container to the dispensing nozzle which dispenses the fuel into the vehicle. A receiving device adapted to receive the signal transmitted from the signal transmitter of the vehicle (or mobile subsystem) is operatively connected to a valve in the fuel additive conduit (or treatment agent conduit) which opens the valve for flow of the fuel additive from the storage container of the stationary subsystem into the vehicle when activated by a signal from the receiving device indicating that the vehicle requires additional fuel additive when it is being fueled. Alternatively, a mechanical level indicator may be present in the mobile subsystem, and the stationary subsystem may comprise a fuel additive dispensing spout bearing a mechanical receptor for the mechanical level indicator.

DETAILED DESCRIPTION OF PREFERRED EMBODIMENTS

As used herein, the terms "fuel additive" and "treatment agent" are used interchangeably and mean, collectively, a substance that is either added to fuel or employed to treat effluent derived from the combustion of fuel. A preferred "treatment agent" or "fuel additive" is an aqueous solution of urea and, optionally, an oxygenated organic compound (or oxygen-containing organic compound). According to the present invention, an oxygenated organic compound includes, but is no limited to, alcohols, ethers, esters, aldehydes, ketones and carboxylic acids. Furthermore, an oxygenated organic compound may include any substance having effective use in the treatment of gasoline and combustion processes. Other "treatment agents" or "fuel additives" include gasoline performance enhancers including, but not limited to, octane enhancers, detergents, and lubricity additives. Additionally, the term "vehicle" is used in its broadest sense herein, referring to any means in or by which something is carried or conveyed.

According to the present invention, the term "nitrogen oxides" or "$NO_x$" refers collectively to both nitric oxide (NO) and nitrogen dioxide ($NO_2$). Hence, the term "$NO_x$ emissions" or "nitrogen oxide emissions" refers to $NO_x$ found in combustion effluent.

As used herein, the term "oxygenated organic compound" means an organic compound having at least one oxygen atom. Alcohols are preferred oxygenated organic compounds. "Alcohol" or "alcohols" include, but are not limited to, polyhydric alcohols (i.e., compounds with more than one hydroxyl group, such as ethylene glycol, propylene glycol, glycerol, polyethylene glycol, and polyoxyalcolamine glycol), and monohydric alcohols (i.e., compounds having one hydroxyl group, such as methanol, ethanol, propanol, and isopropanol).

Figure 1:
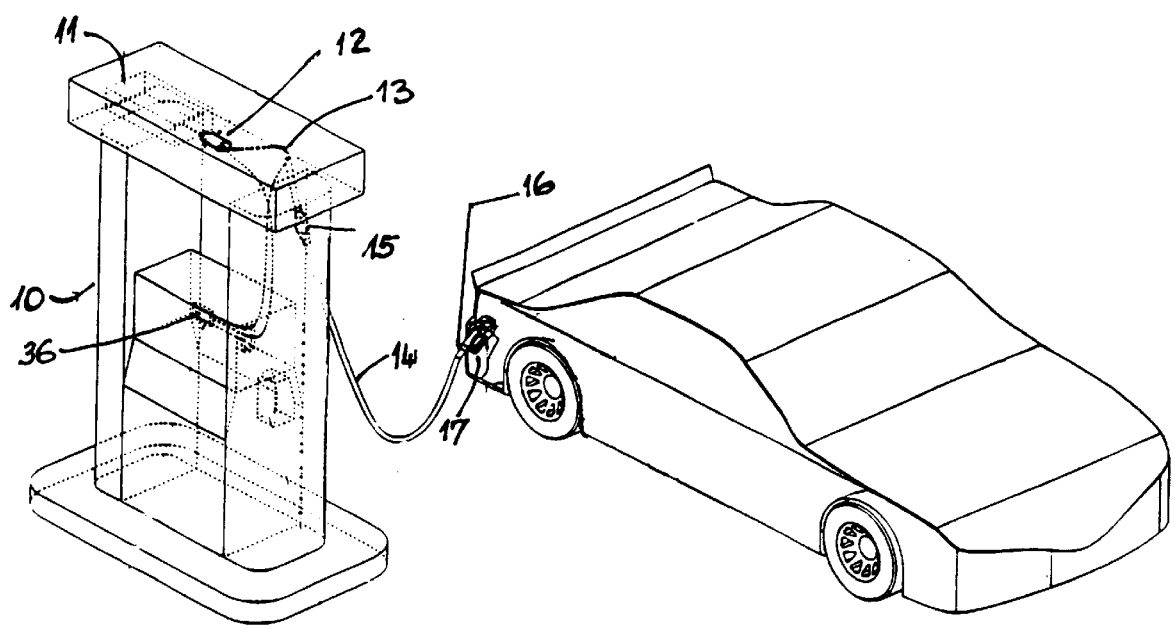
FIG. 1 shows the stationary subsystem for dispensing the fuel additive with fuel to the vehicle.

The vehicle dispensing system of the present invention comprises two subsystems. Referring to FIG. 1, the stationary subsystem of the vehicle dispensing system comprises a conventional fuel pump 10 of the type commonly used in road-side service stations, for example, a diesel fuel pump. A storage container or storage tank 11 for the fuel additive or liquid treatment agent, for example, an aqueous solution of urea, is located in the upper portion of the dispensing unit so that the urea may flow assisted by gravity into the vehicle under the control of the dispensing system. Alternatively, the storage unit may be mounted in an elevated position near the dispensing unit and operated in a similar fashion. Also, the storage unit may be located at a lower position within the dispensing unit with a pump to transfer the fuel additive during refueling operations and, in like manner, the storage unit may be maintained at a distance from the dispensing unit. The location shown in FIG. 1 generally is preferred, with dispensing of the liquid fuel additive taking place by pump with gravity assistance under the control of the system. The storage container may, of course, be provided with a suitable fill aperture and vent to permit filling and emptying of the tank under normal conditions of use. A pump and valve, preferably a solenoid valve, collectively shown in FIG. 1 as 12, is located at the outlet of the storage container and both are under control of the system as described below. The fuel additive dispensing conduit (or treatment agent dispensing conduit) 13 leads into the fueling hose 14 and passes through the fueling hose as a separate conduit from the fuel conduit (and return vapor conduit, if provided). A break-away coupling 15 is provided for safety purposes, as is conventional. The combined fuel and fuel additive dispensing hose terminates in a swivel 16 at dispensing nozzle 17 for ease of use.

Figure 2:
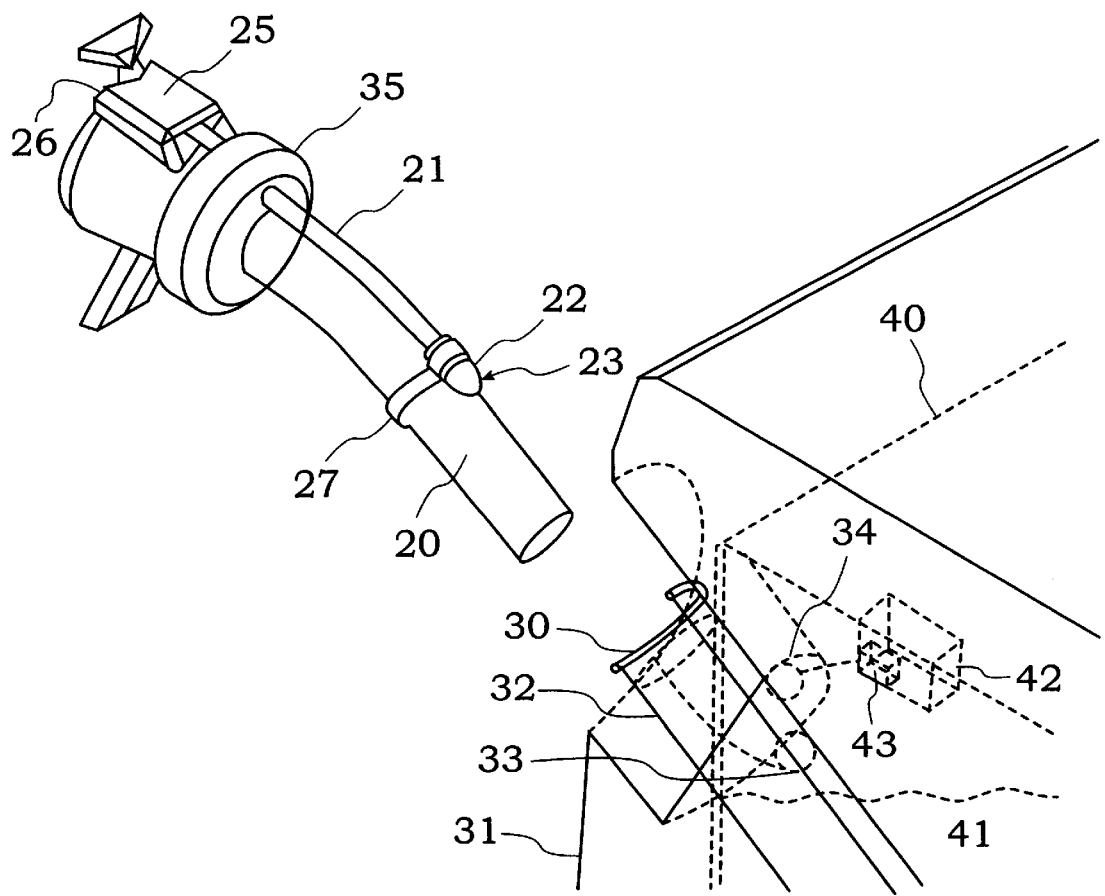
FIG. 2 shows the combined fuel and fuel additive (or treatment agent) dispensing nozzle indicating the manner in which the nozzle interacts with the mobile subsystem of the vehicle.

Referring to FIG. 2, nozzle 17 has a refueling spout 20 for the fuel which is to be dispensed into the fuel tank of the vehicle in the conventional manner. Dispensing of the fuel is regulated by the normal operator actuated dispensing control with a manually operated opening lever and automatic trip mechanism, as is conventional. Nozzles of this type are disclosed in U.S. Pat. Nos. 3,603,359 (Belue) and 3,938,565 (Robinson) to which reference is made, and which are incorporated herein in their entirety, for a description of such a nozzle. In addition, dispensing nozzle 17 includes a spout 21 for the liquid fuel additive which terminates in a guide 22 with a conical seating surface 23 which is located in the vapor path above and around fuel spout 20. The fuel additive dispensing spout (or treatment agent dispensing spout) 21 is connected to the fuel additive dispensing conduit 13 through a check valve 25 which is actuated by means of circuitry in check valve housing 26. The check valve, when closed, serves to prevent the fuel additive in the dispensing hose from draining into the vehicle tank after the vehicle sensor signals that dispensing of the fuel additive is to stop. The double dispensing spouts are held together by clip 27 for mechanical integrity. As an alternative to the side by side arrangement shown in FIG. 2, the spouts may be arranged concentrically with a corresponding configuration for the filler tubes on the vehicle so that the combined fuel and fuel additive nozzle visually more closely resemble conventional fuel-only nozzles.

During their use, the dispensing spouts are inserted into double fill tube 30 of vehicle 31 which has a fuel fill tube 32 and a fuel additive fill tube (or treatment agent fill tube) 33. The fuel fill tube leads to the fuel tank of the vehicle and the fuel additive fill tube is connected to the onboard fuel additive storage container 40 used to contain the fuel additive 41. Fuel spout 20 fits into fuel fill tube 32 in the conventional manner and fuel additive dispensing spout (or treatment agent dispensing spout) 21 connects with the open end of fuel additive fill tube 33 in a similar manner, with the conical face 23 of guide 22 serving to ensure that the fuel additive dispensing spout 21 enters fuel additive fill tube 33 when fuel spout 20 is fully inserted into fuel fill tube 32.

The fuel additive dispensing system of the present invention may be actuated by means of a level sensor 42 (schematically shown) in the fuel additive storage container or treatment agent tank on board the vehicle which provides an indication to the system of the level of fuel additive in the onboard tank and, in particular, whether replenishment is necessary. This level sensor can suitably be similar to a conventional fuel tank level sensor.

An onboard transmitter operatively connected to the fuel additive level sensor provides an indication to the dispensing system of whether the vehicle is of a type which accepts the fuel additive and whether any is necessary at any refueling operation of the vehicle. To this end, the transmitter 43 (schematically shown) is enabled when the level of fuel additive in the onboard tank falls to a predetermined, selected level at which replenishment is required. The transmitter is then enabled and passes a signal by means of tag 34 to a receiving antenna 35 on dispensing nozzle 17 which picks up the signal and provides an indication to the stationary subsystem of the dispensing system that replenishment is required at this refueling. The transmitter and receiving antenna may be of the type conventionally used for wireless radio frequency short range communication, for example, a radio frequency communication system operating typically at about 134.2 kHz or at a frequency otherwise assigned by the regulatory authorities, similar to that described in copending U.S. application Ser. No. 09/057,596.

Alternatively, a mechanical system may be used to activate the fuel additive dispensing system. In this system, a mechanical level indicator, such as a pin member, that is associated with the mobile subsystem, is made to project from a housing when replenishment of the fuel additive is required. The pin engages with a mechanical receptor on the dispensing spout, thereby causing the fuel additive check valve to open to permit release of the fuel additive from the dispensing conduit into the onboard tank. In this case, the release of the fuel additive from the dispensing nozzle through the dispensing spout may be caused by the mechanical engagement of the vehicle pin member with the spout member to open a valve permitting flow of the fuel additive into the vehicle tank. Alternatively, a mechanically operated valve of this type may be used in conjunction with a switch on nozzle 17, actuated by the mechanical engagement, which actuates the treatment agent dispensing pump/solenoid valve unit 12 on dispenser unit 10. Mechanically engaging members such as those described may also be used to actuate a low voltage control unit which opens check valve 25 and actuates the fuel additive pump/solenoid valve (or treatment agent pump/solenoid valve) 11. Since the wireless actuation of the pump is somewhat more reliable than the mechanical actuation, requiring no precise and directed engagement of mechanical members, the electronic actuation of the dispensing system generally is preferred. In this system, receiving antenna 35 on dispensing spout 17 receives the signal from the onboard tag transmitter 34 indicating that replenishment of the fuel additive is required, and upon reception of this signal, the control unit 36 in dispensing unit 10 receives a signal from receiving antenna 35 to actuate the following three components: first, check valve 25 on dispensing nozzle 17 is opened to permit flow of the fuel additive from dispensing conduit 13 through agent dispensing spout 21 into treatment agent fill tube 33 on the vehicle. Second, the dispenser unit solenoid valve in unit 12 is brought to the open position. Third, the treatment agent pump in unit 12 is actuated so as to pump liquid treatment agent from storage tank 11 through dispensing conduit 13 and dispensing spout 21 into the treatment agent fill tube 33 and finally to the treatment agent tank on the vehicle.

Upon completion of the treatment agent replenishment procedure, when the liquid level sensor in the onboard treatment agent tank senses that the tank contains sufficient of the fuel additive or treatment agent, the vehicle tag transmitter 34 is deactivated and this indication is received by antenna 35 on dispensing spout 17 and the indication passed to the dispensing unit control unit 36 which shuts check valve 25 to prevent further dispensing of fuel additive into the vehicle. In addition, the control unit 36 closes dispenser solenoid valve and deactivates the treatment agent pump in valve/pump unit 12 so that no more fuel additive is dispensed into the vehicle. Refueling is then completed in the normal way and the dispensing spout withdrawn from the vehicle and the filler cap replaced.

The dispenser unit control unit 36 has an intrinsically safe barrier exchanging information between the interface box connected to the antenna and the wiring in the dispenser unit itself, the dispensing hose and the dispensing spout. All electrical wiring should conform to appropriate safety standards for fuel dispensing units.

In a preferred embodiment of the present invention, the fuel additive or treatment agent is an aqueous solution of urea used for the reduction of $NO_x$ levels in vehicle exhaust. Preferred fuel additive solutions comprise water, urea, and, optionally, at least one oxygenated organic compound. A preferred oxygenated organic compound is an alcohol. Alcohols may be monohydric or polyhydric alcohols that are miscible with water and form aqueous solutions with a freezing point lower than that of water. Polyhydric alcohols are preferred. Examples of suitable polyhydric alcohols include, but are not limited to, ethylene glycol, glycerol, propylene glycol, polyethylene glycol and polyoxyalcolamine glycol. An especially preferred polyhydric alcohol is ethylene glycol. Monohydric alcohols which may be suitable for compositions of the present invention include, but are not limited to, methanol, ethanol, propanol and isopropanol.

In determining desired amounts of each component in the urea solutions, it is generally favorable to maximize the relative amount of urea in the fuel additive so that a minimal volume of treatment additive may be used to effectively treat nitrogen oxide-containing effluents. Similarly, it is desirable to include an oxygenated organic compound in an amount that is sufficient to obtain a target freezing point for the fuel additive. Target freezing points of the liquid compositions preferably lie below the freezing point of a urea/water solution (for example, 10° F. or −13° C. for a 30% urea solution by weight), although below about −15° F. (−26° C.) is more preferred, and at or lower than about <20° F. (−29° C.) is further preferred. If solution solidification at lower temperatures is not an issue, a solution consisting essentially of water and urea is suitable. Additionally, sufficient water is required to maintain the urea in solution. In a preferred embodiment, the fuel additive comprises about 30% to about 70% by weight of water, about 20% to about 40% by weight of urea, and about 1% to about 40% by weight of oxygenated organic compound. More preferred fuel additive solutions comprise about 35% to about 45% by weight of water, about 25% to about 35% by weight of urea, and about 25% to about 35% by weight of oxygenated organic compound. Further preferred fuel additive solutions comprise about 40% by weight of water, about 30% by weight of urea, and about 30% by weight of oxygenated organic compound. Another fuel additive solution comprises about 50% by weight of water, about 30% by weight of urea, and about 20% by weight of oxygenated organic compound. A preferred oxygenated organic compound is ethylene glycol.

Other fuel additives or treatment agents include gasoline performance enhancers which may be mixed with fuel before combustion in a vehicle. Gasoline performance enhancers include octane enhancers such as methylcyclopentadiene manganese tricarbonyl (MMT), alcohols and water, detergents such as polyalkylamines, polyalkyl succinimides and polyether amines, lubricity additives such as esters, amides and monoacids, and other suitable substances.

What is claimed is:

1. A dispensing system for a fuel additive comprising:
   a mobil subsystem adapted to be incorporated into a vehicle, said mobile subsystem comprising:
     an additive storage container, adapted for storing said fuel additive;
     a level sensor operatively connected to said additive storage container;
     a signal transmitter operatively connected to said level sensor; and
     a double fill tube comprising a fuel fill tube connected to a fuel tank and a fuel additive fill tube connected to said additive storage container; and
   a stationary subsystem, adapted to be incorporated into a vehicle fuel dispenser, said stationary subsystem comprising:
     a stationary storage container, adapted for storing said fuel additive, said stationary storage container bearing a pump and a firsts valve;
     a nozzle bearing a fuel additive dispensing spout and a fuel dispensing spout, said fuel additive dispensing spout bearing a second valve;
     a fuel additive dispensing conduit, said conduit extending from said stationary storage container to said fuel additive dispensing spout of said nozzle;
     a receiving device capable of receiving a signal transmitted from said signal transmitter of said mobile subsystem; and
     a control unit operatively connected to said receiving device, said first valve, said second valve, and said pump.

2. The dispensing system of claim 1 wherein said fuel additive dispensing spout is adjacent to said fuel dispensing spout.

3. The dispensing system of claim 1 wherein said fuel additive dispensing spout is arranged concentrically with said fuel dispensing spout.

4. The dispensing system of claim 1 wherein said signal transmitter on said mobile subsystem is a wireless radio frequency signal transmitter.

5. The dispensing system of claim 1 wherein said vehicle fuel dispenser is a diesel fuel dispenser.

6. The dispensing system of claim 1 wherein said vehicle fuel dispenser is a gasoline dispenser.

7. The dispensing system of claim 1 wherein said fuel additive dispensing spout terminates in a guide with a conical seating surface.

8. The dispensing system of claim 1 wherein said receiving device comprises an antenna.

9. The dispensing system of claim 1 wherein said receiving device is located on said nozzle.

10. The dispensing system of claim 1 wherein said first valve is a solenoid valve.

11. The dispensing system of claim 1 wherein said second valve is a check valve.

12. A dispensing system for a fuel additive which is used to reduce emissions from the operation of a vehicle comprising:
   a mobile subsystem adapted to be incorporated into said vehicle, said mobile subsystem comprising:
     an amount of a fuel additive;
     an additive storage container adapted for storing said fuel additive;
     a mechanical level indicator; and
     a double fill tube comprising a fuel fill tube connected to a fuel tank and a fuel additive fill tube connected to said additive storage container; and
   a stationary subsystem incorporated into a vehicle fuel dispenser, said stationary subsystem comprising:
     a stationary storage container adapted for storing said fuel additive, said stationary storage container bearing a pump and a first valve;
     a nozzle bearing a fuel additive dispensing spout and a fuel dispensing spout, said fuel additive dispensing spout bearing a second valve and a mechanical receptor for said mechanical level indicator;
     a fuel additive dispensing conduit, said conduit extending from said stationary storage container to said fuel additive dispensing spout of said nozzle; and
     a control unit operatively connected to say mechanical receptor, said first valve, said second valve, and said pump.

13. The dispensing system of claim 12 wherein said fuel additive is a gasoline performance enhancer.

14. The dispensing system of claim 13 wherein said fuel additive is selected from the group consisting of an octane enhancer, a detergent, or a lubricity additive.

15. The dispensing system of claim 12 wherein said vehicle fuel dispenser is a diesel fuel dispenser.

16. The dispensing system of claim 12 wherein said vehicle fuel dispenser is a gasoline dispenser.

17. The dispensing system of claim 12 wherein said fuel additive is a solution comprising urea and water.

18. The dispensing system of claim 17 wherein said fuel additive further comprises an oxygenated organic compound.

19. The dispensing system of claim 18 wherein said oxygenated organic compound is an alcohol.

20. The dispensing system of claim 19 wherein said alcohol is ethylene glycol, glycerol, propylene glycol, polyethylene glycol or polyoxyalcolamine glycol.

21. The dispensing system of claim 19 wherein said alcohol is methanol, ethanol, propanol or isopropanol.

22. The dispensing system of claim 19 wherein said fuel additive comprises about 30% to about 70% by weight of water, about 20% to about 40% by weight urea, and about 1% to about 40% by weight of ethylene glycol.

23. The dispensing system of claim 22 wherein said fuel additive comprises about 35% to about 45% by weight of water, about 25% to about 35% by weight urea, and about 25% to about 35% by weight of ethylene glycol.

24. The dispensing system of claim 23 wherein said fuel additive comprises about 40% by weight of water, about 30% by weight urea, and about 30% by weight of ethylene glycol.

25. The dispensing system of claim 24 wherein said oxygenated organic compound is ethylene glycol.

* * * * *